United States Patent
Horie

(10) Patent No.: US 12,413,841 B2
(45) Date of Patent: Sep. 9, 2025

(54) ELECTRONIC APPARATUS AND CONTROL METHOD FOR ELECTRONIC APPARATUS

(71) Applicant: CANON KABUSHIKI KAISHA, Tokyo (JP)

(72) Inventor: Nobuyuki Horie, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 18/047,592

(22) Filed: Oct. 18, 2022

(65) Prior Publication Data

US 2023/0125838 A1    Apr. 27, 2023

(30) Foreign Application Priority Data

Oct. 22, 2021    (JP) ................. 2021-173260

(51) Int. Cl.
*G06T 15/00*    (2011.01)
*H04N 23/611*    (2023.01)
*H04N 23/63*    (2023.01)

(52) U.S. Cl.
CPC ......... *H04N 23/611* (2023.01); *H04N 23/635* (2023.01)

(58) Field of Classification Search
CPC ......... G06T 19/00; G06T 17/20; G06T 17/00; G06T 15/10; G06T 15/00; G06T 13/40; G06T 15/06; G06T 15/08; G06T 15/20; G06T 15/04; G06T 2210/41; G06T 15/005; G06T 1/20; G06T 19/006; G06T 7/337; G06T 7/50; G06T 7/74; G06T 19/20; G06T 2200/04; G06T 2207/10016; G06T 2207/30244; G06T 2219/024; G06T 2219/2016; G06T 2210/12; G06T 2210/21; G06T 7/70; G06T 2207/20084; G06F 16/51; G06F 21/602; H04N 23/64;
(Continued)

(56) References Cited

U.S. PATENT DOCUMENTS

| 2016/0198950 A1* | 7/2016 | Gross ..................... A61B 3/113 351/209 |
| 2019/0320962 A1* | 10/2019 | Hill ....................... A61B 5/7405 |
| 2020/0214559 A1* | 7/2020 | Krueger ................ A61B 5/163 |

FOREIGN PATENT DOCUMENTS

| JP | 2004008323 A | 1/2004 |
| JP | 2005303843 A | 10/2005 |

(Continued)

*Primary Examiner* — Gordon G Liu
(74) *Attorney, Agent, or Firm* — CANON U.S.A., INC. IP DIVISION

(57) ABSTRACT

An electronic apparatus includes at least one memory and at least one processor which function as: a first acquiring unit configured to detect a line-of-sight of a user and to acquire a line-of-sight position of the user in an image displayed on a display; a second acquiring unit configured to acquire a position of an object in the image; and an adjustment unit configured to adjust line-of-sight responsiveness, which is responsiveness by which movement of the line-of-sight of the user is reflected in the line-of-sight position on the basis of a shift amount in a moving amount for predetermined time between a moving amount of the line-of-sight position and a moving amount of the position of the object, or a shift amount in moving time for a predetermined distance between moving time of the line-of-sight position and moving time of the position of the object.

14 Claims, 14 Drawing Sheets

(58) Field of Classification Search
CPC .... H04N 23/90; H04N 23/611; H04N 23/635; G06V 20/20
USPC ........................................................ 345/419
See application file for complete search history.

(56) References Cited

FOREIGN PATENT DOCUMENTS

| | | |
|---|---|---|
| JP | 2019020716 A | 2/2019 |
| JP | 2021156950 A | 10/2021 |

* cited by examiner

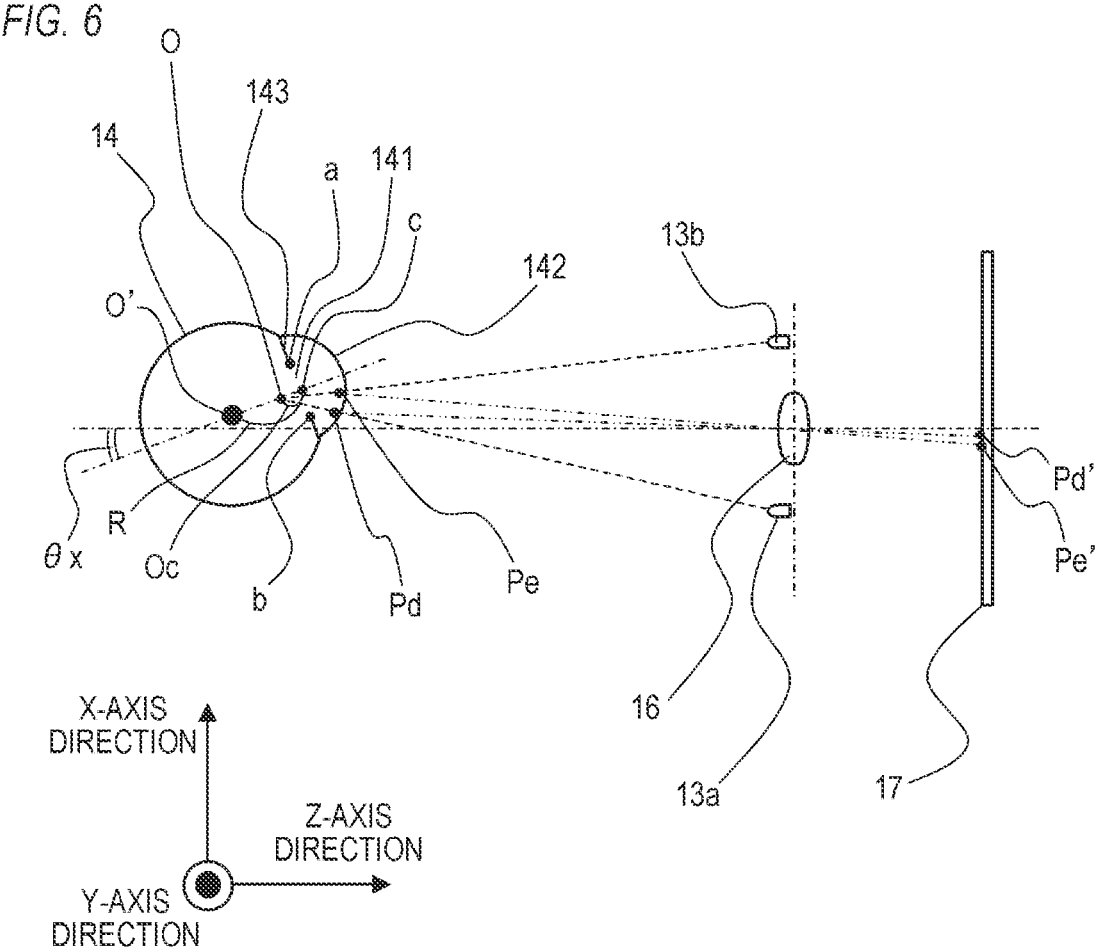

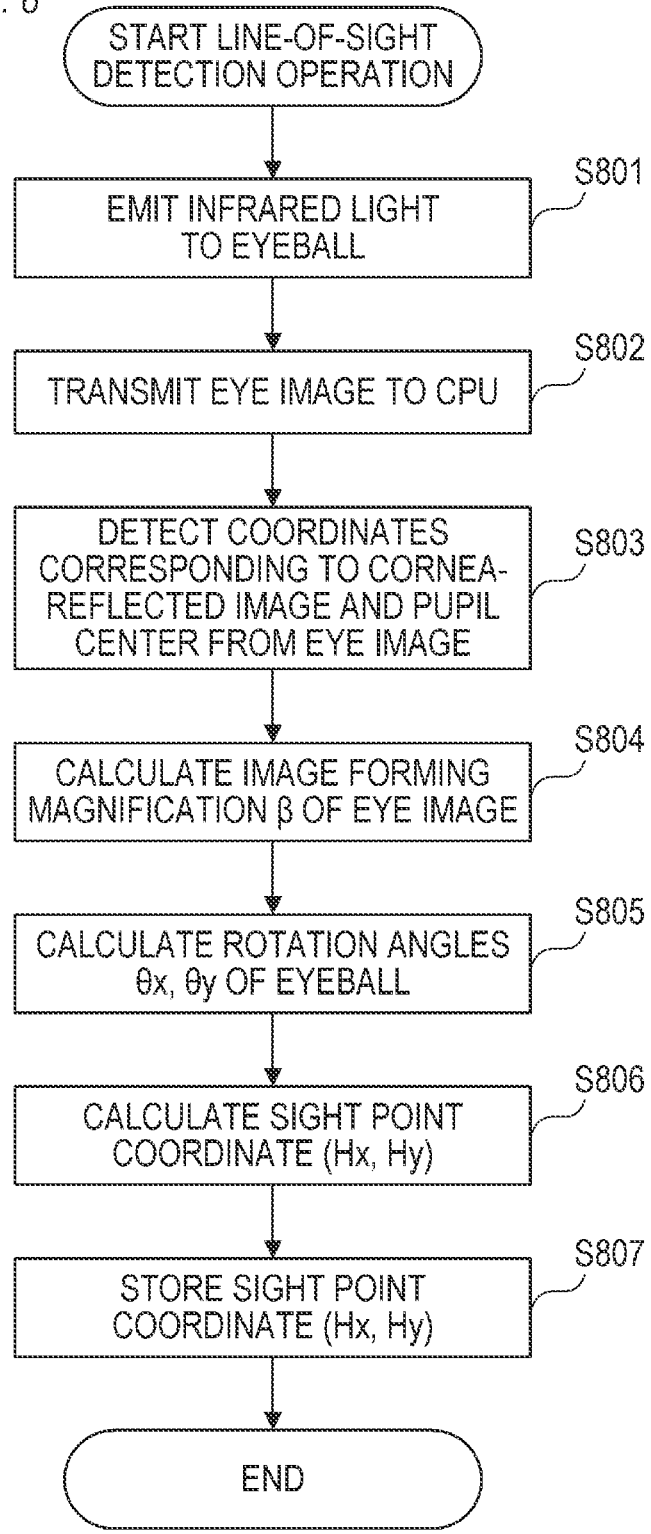

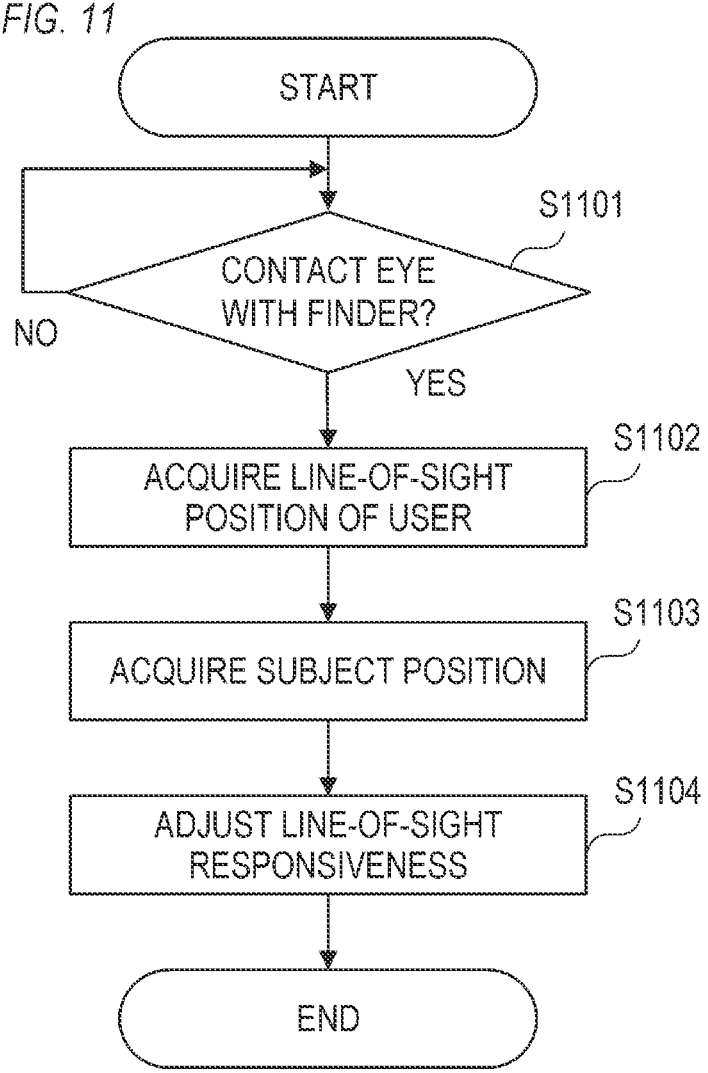

| PHOTOGRAPHED SCENE | LINE-OF-SIGHT RESPONSIVENESS | PARAMETER |
|---|---|---|
| SOCCER | HIGH | K1 |
| VOLLEYBALL | MEDIUM | K2 |
| TRACK AND FIELD | LOW | K3 |
| SKATING | LOW | K3 |
| ... | ... | ... |

ELECTRONIC APPARATUS AND CONTROL METHOD FOR ELECTRONIC APPARATUS

BACKGROUND

Field of the Disclosure

The present disclosure relates to an electronic apparatus capable of detecting a line-of-sight position and a control method for the electronic apparatus.

Description of the Related Art

In recent years, automation/making intelligent of a camera has progressed. For example, such an art is proposed that, without manually inputting a position of a subject (object), the subject intended by a user is recognized on the basis of information of a line-of-sight of the user who looks into a finder, and focus control is performed.

When a camera detects the line-of-sight of the user, there is such a case that a position of the line-of-sight intended by the user is shifted from a line-of-sight position of the user recognized by the camera, and the subject intended by the user is not focused.

In order to cope with that, Japanese Patent Application Publication No. 2004-008323 discloses an art of displaying an indicator in the finder and correcting a detection error of a line-of-sight of an observer who stares at the indicator. Moreover, Japanese Patent Application Publication No. 2019-020716 discloses an art to cause the subject to be followed properly and continuously by performing focusing on the basis of parameters of a following operation set in accordance with movement of the subject, movement of an image pickup device and the like.

However, with the art of Japanese Patent Application Publication No. 2004-008323, the detected line-of-sight position has been corrected without considering a reaction speed of the line-of-sight with respect to an object. Since the reaction speed of the line-of-sight differs depending on the user, if responsiveness of the line-of-sight position detected with respect to the line-of-sight of the user is made the same, there is a case where the subject intended by the user is not focused.

According to the art of Japanese Patent Application Publication No. 2019-020716, since the reaction speed of the line-of-sight is not considered, when a plurality of subjects are included in an image angle of the camera, identification of a photographing target is slowed by movement of the line-of-sight, and it becomes difficult to focus on the subject intended by the user at appropriate timing in some cases.

SUMMARY

The present disclosure provides an electronic apparatus which can adjust responsiveness of a line-of-sight position detected with respect to a line-of-sight of a user by considering a reaction speed of the line-of-sight of the user with respect to an object.

An electronic apparatus according to the present disclosure includes at least one memory and at least one processor which function as: a first acquiring unit configured to detect a line-of-sight of a user and to acquire a line-of-sight position of the user in an image displayed on a display; a second acquiring unit configured to acquire a position of an object in the image; and an adjustment unit configured to adjust line-of-sight responsiveness, which is responsiveness by which movement of the line-of-sight of the user is reflected in the line-of-sight position on the basis of a shift amount in a moving amount for predetermined time between a moving amount of the line-of-sight position and a moving amount of the position of the object, or a shift amount in moving time for a predetermined distance between moving time of the line-of-sight position and moving time of the position of the object.

Further features of the present disclosure will become apparent from the following description of exemplary embodiments with reference to the attached drawings.

BRIEF DESCRIPTION OF THE DRAWINGS

FIG. 6 is a diagram for explaining a principle of a vision-field detecting method according to one or more aspects of the present disclosure.

FIG. 8 is a flowchart of a line-of-sight detection operation.

FIG. 11 is a flowchart of a changing operation of the line-of-sight responsiveness.

DESCRIPTION OF THE EMBODIMENTS

An art of detecting a line-of-sight position can be utilized not only in a case where a subject stared at by a user is to be recognized by a camera but also in xR (collective name for virtual reality (VR), augmented reality (AR), mixed reality (MR), substitutional reality (SR) and the like) and the like, for example. For example, a head-mount display (HMD) can determine a position where the user stares at in a video and clearly depict a vicinity of a sight point (line-of-sight position), while a periphery far from the sight point can be expressed blurredly. Pseudo-expression of a depth of field on the video with the sight point as a reference improves a sense of immersion by the user and contributes to provision of more comfortable VR experiences. Therefore, the detected line-of-sight position preferably follows the subject (object) intended by the user more accurately.

However, a reaction speed of the line-of-sight of the user with respect to the object is changed in accordance with an age, a body condition and the like in some cases, and if the responsiveness of the line-of-sight position detected with respect to the line-of-sight is made uniform, there is a concern that following accuracy of the line-of-sight position with respect to the object intended by the user is lowered. The present disclosure can improve the following accuracy of the line-of-sight position with respect to the object by adjusting the responsiveness of the line-of-sight position detected with respect to the line-of-sight of the user with consideration to the reaction speed of the user's line-of-sight with respect to the object. Hereinafter, the responsiveness of the detection position of the line-of-sight with respect to an actual line-of-sight of the user is also called line-of-sight responsiveness. The line-of-sight responsiveness is responsiveness by which movement of the user's line-of-sight is reflected in the line-of-sight position. In the following embodiment, description will be made by assuming that the object is a subject of the camera, but the present disclosure can be also applied similarly to an object in an image displayed on the HMD and the like.

Embodiment

Hereinafter, embodiments of the present disclosure will be described with reference to the attached drawings.

Description of Configuration

Figure 1A:
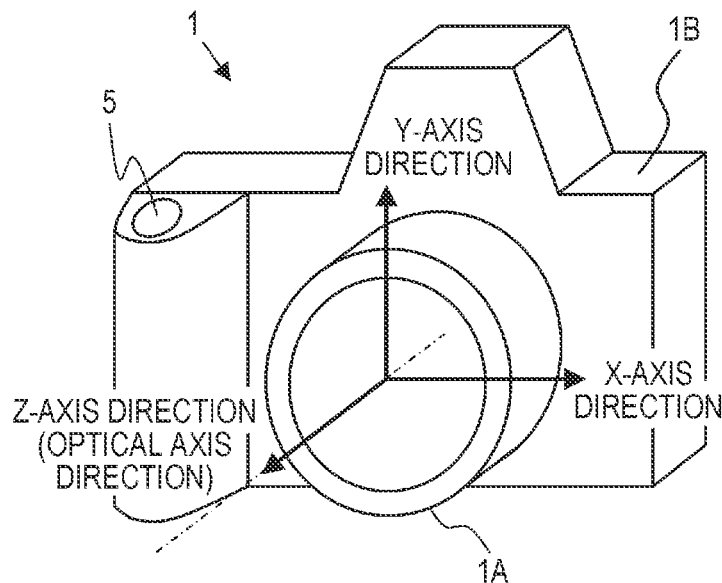
FIGS. 1A and 1B are appearance diagrams of a camera according to one or more aspects of the present disclosure.
Figure 1B:
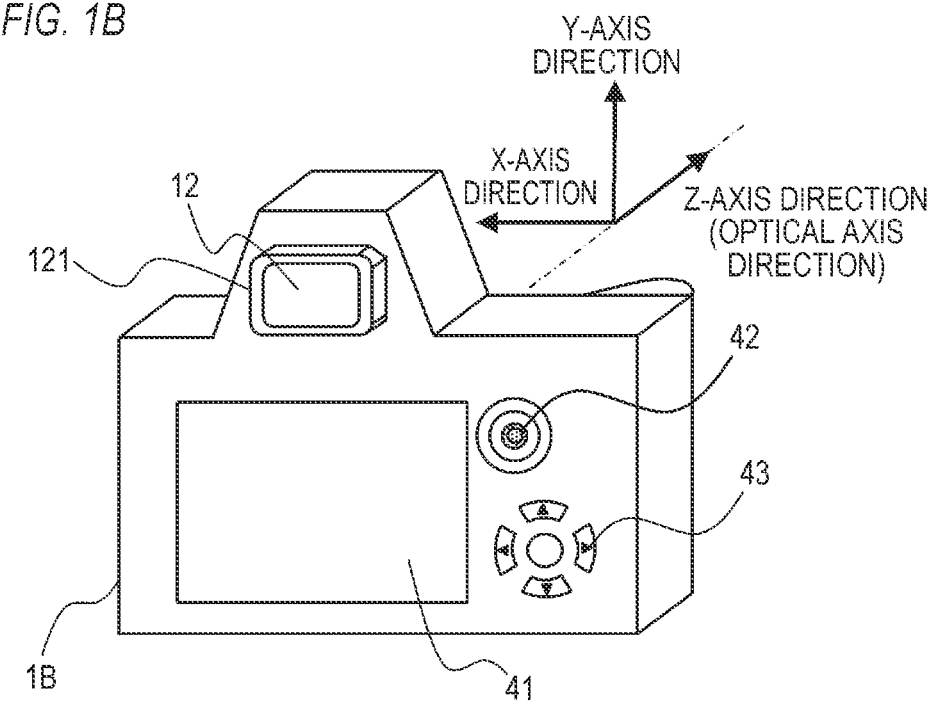

FIGS. 1A and 1B illustrate an appearance of a camera 1 as an electronic apparatus according to an embodiment. FIG. 1A is a front perspective view, and FIG. 1B is a rear perspective view. As shown in FIG. 1A, the camera 1 has a photographing lens unit 1A and a camera casing 1B. In the camera casing 1B, a release button 5, which is an operating member that accepts an imaging operation from a user (photographer) is disposed. As shown in FIG. 1B, on a rear surface of the camera casing 1B, an ocular window frame 121 for the user to look into a display device 10 (display panel), which will be described later, included in the camera casing 1B and an ocular lens 12 (ocular optical system) are disposed. The ocular window frame 121 surrounds an ocular lens 12 and protrudes to an outer side (rear surface side) of the camera casing 1B with respect to the ocular lens 12. The ocular optical system may include a plurality of lenses. On the rear surface of the camera casing 1B, operating members 41 to 43 which accept various operations from the user are also disposed. For example, the operating member 41 is a touch panel which accepts a touch operation, the operating member 42 is an operation lever which can be pushed down in each direction, and the operating member 43 is a four-way key capable of being pushed in each of four directions. The operating member 41 (touch panel) includes a display panel such as a liquid crystal panel or the like and has a function of displaying images on the display panel.

Figure 2:
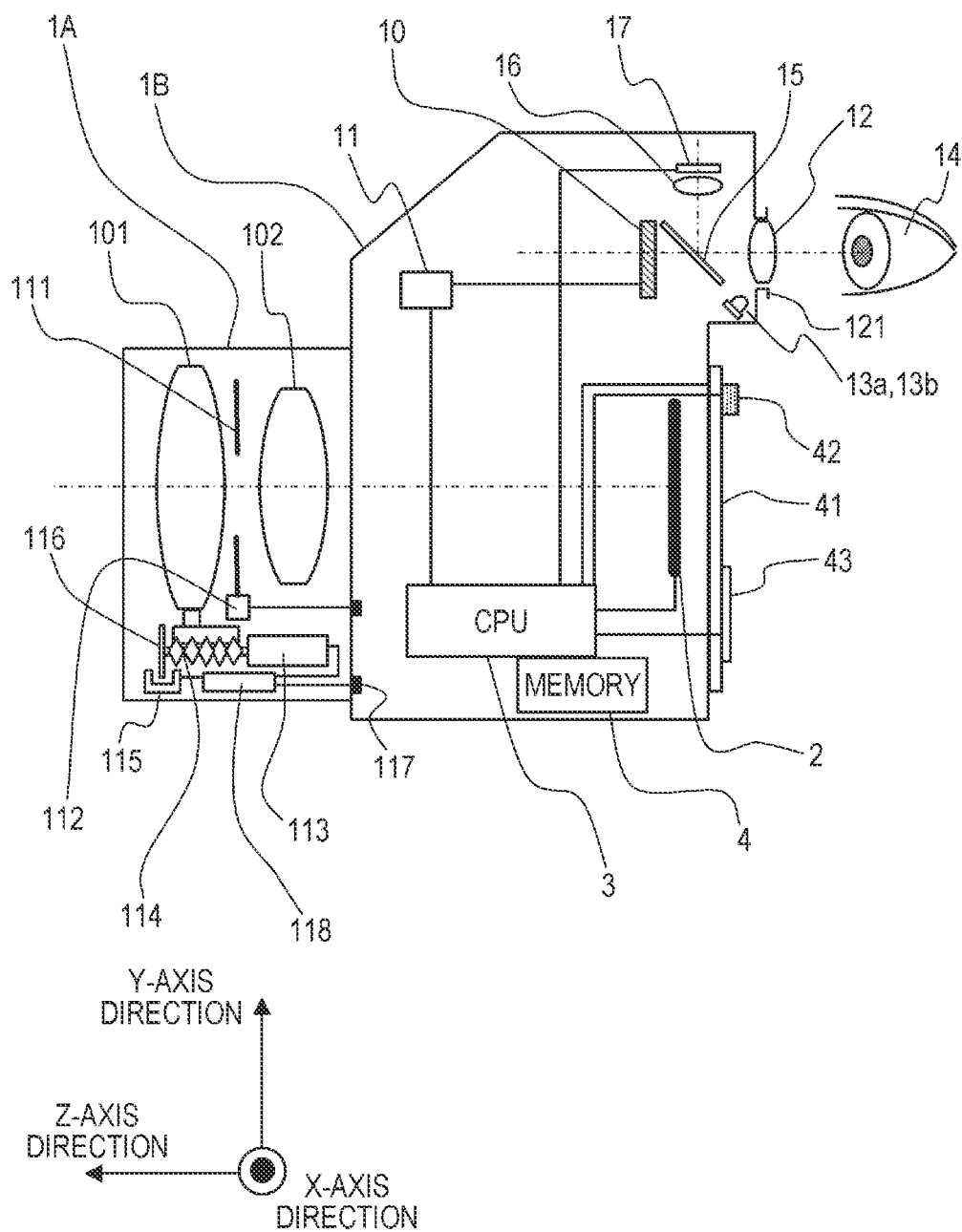
FIG. 2 is a schematic configuration diagram of the camera according to one or more aspects of the present disclosure.

FIG. 2 is a sectional view acquired by cutting the camera 1 on a YZ plane formed by a Y-axis and a Z-axis shown in FIG. 1A and illustrates a rough internal configuration of the camera 1.

The photographing lens unit 1A includes two lenses 101, 102, a diaphragm 111, a diaphragm drive portion 112, a lens drive motor 113, a lens drive member 114, a photocoupler 115, a pulse plate 116, a mount contact 117, a focus adjustment circuit 118 and the like. The lens drive member 114 is constituted by a drive gear and the like, and the photocoupler 115 senses rotation of the pulse plate 116 interlocking with the lens drive member 114 and transmits it to the focus adjustment circuit 118. The focus adjustment circuit 118 drives the lens drive motor 113 on the basis of information from the photocoupler 115 and information from the camera casing 1B (information of lens drive amount) and changes a focusing position by moving the lens 101. The mount contact 117 is an interface between the photographing lens unit 1A and the camera casing 1B. The two lenses 101, 102 are shown for simplicity, but actually, more than two lenses are included in the photographing lens unit 1A.

In the camera casing 1B, an image pickup element 2, a CPU 3, a memory 4, the display device 10, a display-device drive circuit 11 and the like are included. The image pickup element 2 is disposed on an expected image-forming surface of the photographing lens unit 1A. The CPU 3 is a central processing unit of a microcomputer and controls the entire camera 1. The memory 4 stores images and the like picked up by the image pickup element 2. The display device 10 is constituted by a liquid crystal and the like and displays the picked-up image (subject image) and the like on a screen (display surface) of the display device 10. The display-device drive circuit 11 drives the display device 10.

In the camera casing 1B, light sources 13a, 13b, a light divider 15, a light-receiving lens 16, an image pickup element 17 for eye and the like are also included. The light sources 13a, 13b are light sources used for detecting a line-of-sight direction from a relationship between a reflected image (cornea-reflected image) by corneal reflection of light and a pupil and are light sources for illuminating an eyeball 14 of the user. Specifically, the light sources 13a, 13b are infrared light-emitting diodes or the like which emit insensible infrared light to the user and are disposed around the ocular lens 12. An optical image of the illuminated eyeball 14 (eyeball image; image by reflected light emitted from the light sources 13a, 13b and reflected by the eyeball 14) is transmitted through the ocular lens 12 and is reflected by the light divider 15. Then, the eyeball image is formed by the light-receiving lens 16 on the image pickup element 17 for eye in which photoelectric element rows such as CCD, CMOS and the like are aligned two-dimensionally. The light-receiving lens 16 positions the pupil of the eyeball 14 and the image pickup element 17 for eye in a conjugate image-forming relationship. By means of a predetermined algorithm, which will be described later, the line-of-sight direction of the eyeball 14 (sight-point on the screen of the display device 10) is detected from a position of the cornea-reflected image in the eyeball image formed on the image pickup element 17 for eye.

Figure 3:
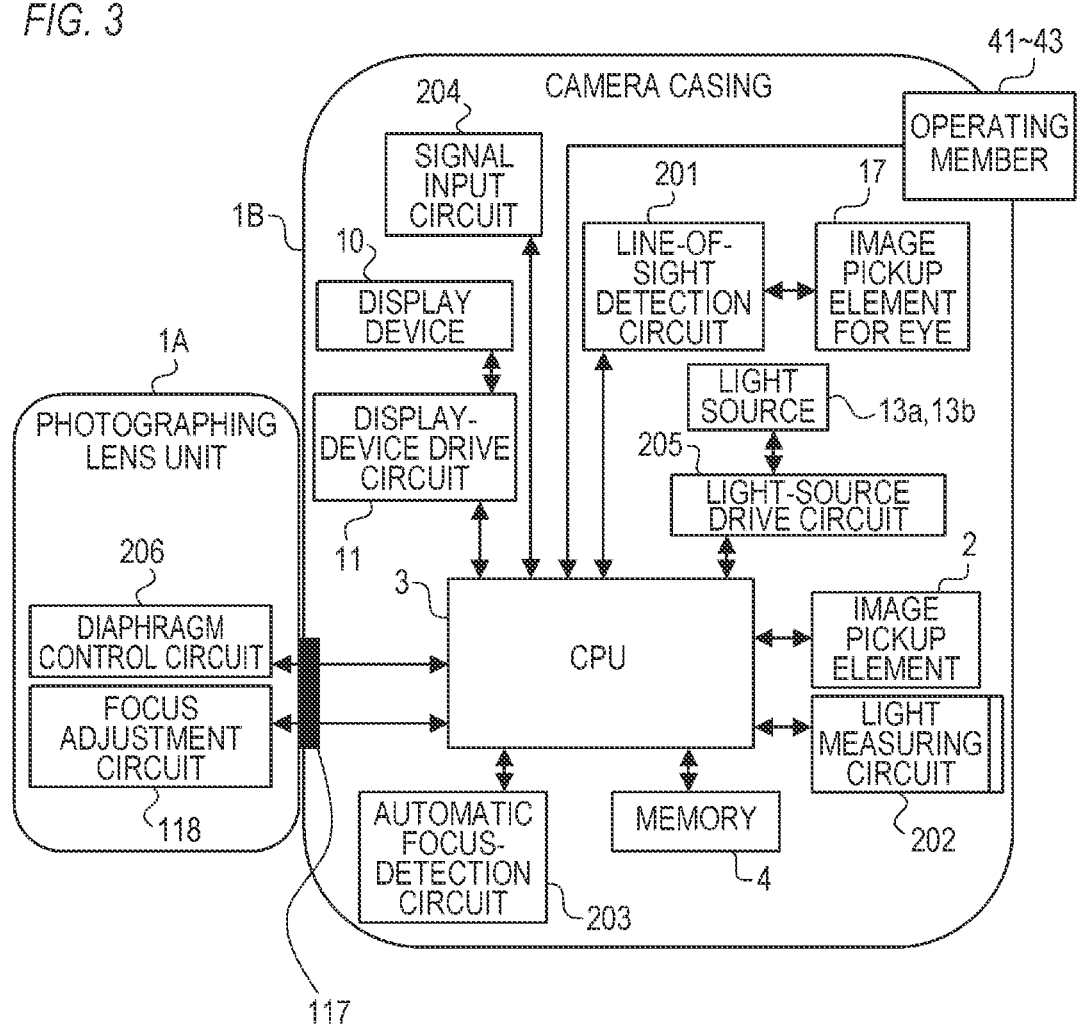
FIG. 3 is a block diagram of the camera according to one or more aspects of the present disclosure.

FIG. 3 is a block diagram illustrating an electric configuration in the camera 1. To the CPU 3, a line-of-sight detection circuit 201, a light measuring circuit 202, an automatic focus-detection circuit 203, a signal input circuit 204, the display-device drive circuit 11, a light-source drive circuit 205 and the like are connected. Moreover, the CPU 3 transmits a signal to the focus adjustment circuit 118 disposed in the photographing lens unit 1A and a diaphragm control circuit 206 included in the diaphragm drive portion 112 in the photographing lens unit 1A through the mount contact 117. The memory 4 attached to the CPU 3 has a storage function of an image pickup signal from the image pickup element 2 and the image pickup element 17 for eye and a storage function of a line-of-sight correction parameter which corrects an individual difference of the line-of-sight, which will be described later.

The line-of-sight detection circuit 201 A/D converts an output (picked-up eye image) of the image pickup element 17 for eye in a state where an eyeball image is formed on the image pickup element 17 for eye (CCD-EYE) and transmits the result to the CPU 3. The CPU 3 extracts feature points required for line-of-sight detection from the eye image in accordance with a predetermined algorithm, which will be described later, and calculates a line-of-sight (sight point on the screen of the display device 10) of the user from a position of the feature point.

The light measuring circuit 202 performs amplification, logarithmic compression, A/D conversion and the like of a signal acquired from the image pickup element 2 which also serves as a light measuring sensor, or more specifically, a brightness signal corresponding to brightness of a subject field and sends the result as subject field brightness information to the CPU 3.

The automatic focus-detection circuit 203 A/D converts signal voltages from a plurality of detection elements (a plurality of pixels) included in a CCD in the image pickup element 2 and used for phase-difference detection and sends them to the CPU 3. The CPU 3 calculates a distance to the subject corresponding to each of the focus detection points from the signals of the plurality of detection elements. This is a publicly known art, which is known as an image-pickup plane phase-difference AF. In this embodiment, as an example, it is supposed that there is a focus detection point at each of 180 spots on an image pickup surface corresponding to 180 spots shown in a view-field image (screen of the display device 10) in the finder in FIG. 5A. The CPU 3 can determine a range capable of focusing by the photographing lens unit 1A by acquiring type information of the lens, optical information and the like.

Moreover, the CPU 3 has a function of selecting a subject (object) to be a main object from target objects in a view angle and of acquiring a position of the selected subject. In a case where the subject is a human, for example, the CPU 3 can acquire a region of the human included in the view angle as a candidate region of the subject from an image acquired by the image pickup element 2 by using a publicly-known art for recognizing a face region or a pupil region. When a plurality of subjects are detected, the CPU 3 may select a main subject on the basis of a distance from a center in the view angle, a size of the subject and the like.

Moreover, when the image pickup element 2 capable of the image-pickup plane phase-difference AF is employed, the CPU 3 can select a target at a position more proximate to the user than a background region as a subject from a distance measurement result in the region in the view angle.

Furthermore, the CPU 3 may estimate a subject type by inputting a learning model generated by deep learning of an image acquired from the image pickup element 2 such as CNN (Convolution Neural Network) or the like. The CPU 3 can select a target of a specific type such as an estimated human, an animal or the like as the subject.

The selecting method of the subject is not limited to the examples above but only needs to be a method which can select a target to be a subject from the targets in the view angle. For example, the CPU 3 can select a type of target set in the camera 1, a moving target and the like as the subject.

When the CPU 3 has selected the main subject, it compares an image of the previous frame with an image of the current frame from image information acquired from the image pickup element 2 and can continuously acquire the position of the selected subject by using a publicly-known pattern matching art and the like.

To the signal input circuit 204, a switch SW1 that is turned ON by a first stroke of the release button 5 and starts light measurement, distance measurement, line-of-sight detection operations and the like of the camera 1 and a switch SW2 that is turned ON by a second stroke of the release button 5 and starts a photographing operation are connected. ON signals from the switches SW1 and SW2 are input into the signal input circuit 204 and are transmitted to the CPU 3.

The light-source drive circuit 205 drives the light sources 13*a*, 13*b*.

The operating member 41 to the operating member 43 are configured so that respective operation signals are transmitted to the CPU 3 and control movement of the detected (acquired) sight point in accordance with the received operation signals.

Figure 4:
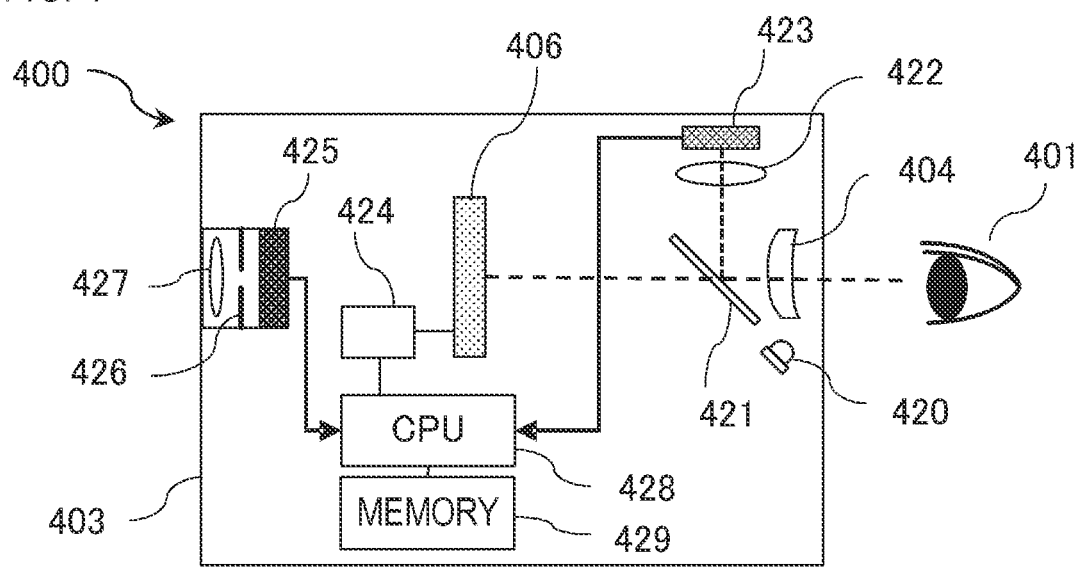
FIG. 4 is a schematic configuration diagram of a head-mount display according to one or more aspects of the present disclosure.

By referring to FIG. 4, a configuration that the head-mount display (hereinafter referred to as an HMD 400) of xR to which the present disclosure can be applied for detecting a line-of-sight will be described. FIG. 4 is a schematic configuration diagram of the HMD 400. FIG. 4 schematically illustrates the internal configuration of the HMD 400 on the YZ-plane when seen from a left-eye side, but the HMD 400 also has a configuration on a right-eye side similar to that of the left-eye side.

By referring to FIG. 4, a configuration included inside a casing 403 of the HMD 400 will be described. The HMD 400 includes a CPU 428 and a memory 429. The CPU 428 controls the entire HMD 400. The memory 429 records video information.

Moreover, the HMD 400 has a display 406, a display drive circuit 424, and an ocular lens 404 disposed inside the casing 403. The display 406 is constituted by a liquid crystal and the like for displaying a video. The display drive circuit 424 drives the display 406. The ocular lens 404 is used for the user to observe the video displayed on the display 406.

An image pickup element 425, a diaphragm mechanism 426, and a focus mechanism 427 function as a camera which picks up an image of an outside. By means of this function, the user can check the outside in a state where the HMD 400 is attached. Imaging information of the image pickup element 425 may be switched to an internal video depending on the use or may be displayed in combination with the internal video on the display 406.

An illumination light source 420 is a light source which emits light to an eyeball 401 for line-of-sight detection. The illumination light source 420 includes a plurality of infrared light-emitting diodes and is disposed around the ocular lens 404, for example. An image of the eyeball to which the light is emitted and an image by corneal reflection of the light source are transmitted through the ocular lens 404, reflected by a light divider 421, and forms an image on an image pickup element 423 for eyeball in which a row of photoelectric elements such as a CMOS or the like is disposed two-dimensionally by a light-receiving lens 422.

The light-receiving lens 422 positions a pupil of the eyeball 401 of the user and the image pickup element 423 for eyeball in a complementary image-forming relationship. From a positional relationship between the eyeball whose image is formed on the image pickup element 423 for eyeball and the image by the corneal reflection of the illumination light source 420, the line-of-sight direction is detected in accordance with a predetermined algorithm, which will be described later. Note that the illumination light source 420, the light divider 421, the light-receiving lens 422, and the image pickup element 423 for eyeball function as a line-of-sight detector. The memory 429 stores image pickup signals from the image pickup element 425 and the image pickup element 423 for eyeball, line-of-sight correction data and the like.

Figure 5A:
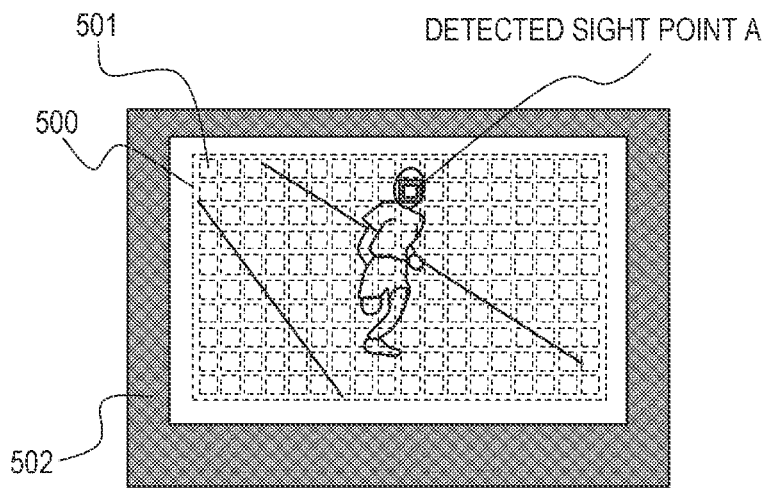
FIGS. 5A to 5C are diagrams illustrating a field of vision in a finder according to one or more aspects of the present disclosure.

FIG. 5A is a diagram illustrating a field of vision in the finder and illustrates a state in which the display device 10 is operated (state where the image is displayed). As shown in FIG. 5A, in the field of vision in the finder, there are a focus detection region 500, 180 pieces of distance-measuring point indicators 501, a field-of-vision mask 502 and the like. Each of the 180 pieces of the distance-measuring point indicators 501 is displayed by overlapping a through image (live-view image) displayed on the display device 10 so that it is displayed at a position corresponding to a focus detection point on the image pickup surface. In addition, in the 180 pieces of the distance-measuring point indicators 501, the distance-measuring point indicator 501 corresponding to a current sight point A (line-of-sight position) of the user in the through image is displayed by being highlighted with a frame or the like.

Description of Line-of-Sight Detection Operation

Figure 7A:
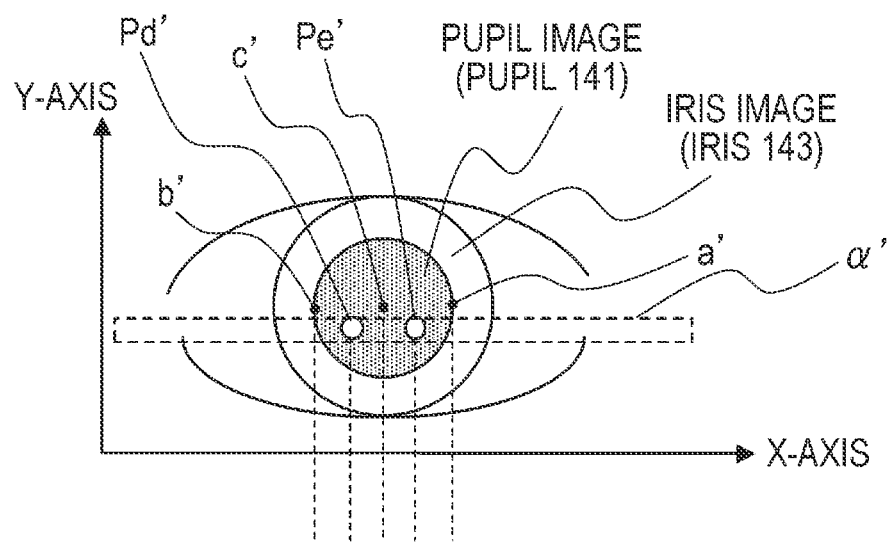
FIGS. 7A and 7B are diagrams illustrating an eye image according to one or more aspects of the present disclosure.
Figure 7B:
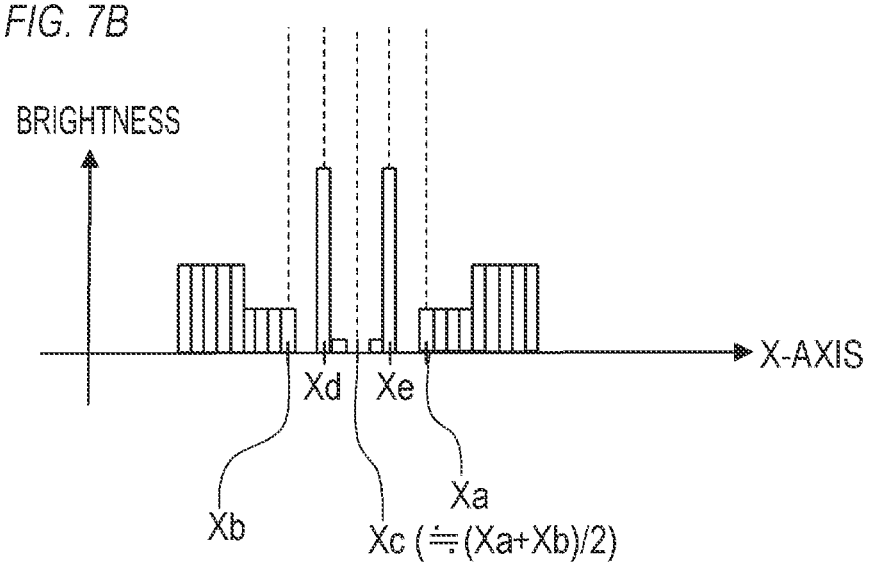

By using FIGS. 6, 7A, 7B, and 8, the line-of-sight detecting method (algorithm of line-of-sight detection) will be described. FIG. 6 is a diagram for explaining a principle of the line-of-sight detecting method and is a schematic diagram of an optical system for conducting the line-of-sight detection. As shown in FIG. 6, the light sources 13a, 13b are disposed substantially symmetrically to the optical axis of the light-receiving lens 16 and illuminate the eyeball 14 of the user. A part of the light emitted from the light sources 13a, 13b and reflected on the eyeball 14 is collected by the light-receiving lens 16 to the image pickup element 17 for eye. FIG. 7A is a schematic diagram of the eye image (eyeball image projected to the image pickup element 17 for eye) picked up by the image pickup element 17 for eye, and FIG. 7B is a diagram illustrating an output intensity of a CCD in the image pickup element 17 for eye. FIG. 8 illustrates a schematic flowchart of the line-of-sight detection operation.

When the line-of-sight detection operation is started, at Step S801 in FIG. 8, the light sources 13a, 13b emit infrared light toward the eyeball 14 of the user. The eyeball image of the user illuminated with the infrared light is formed on the image pickup element 17 for eye through the light-receiving lens 16 and is photoelectrically converted by the image pickup element 17 for eye. As a result, an electric signal of the eye image capable of being processed is acquired.

At Step S802, the line-of-sight detection circuit 201 sends the eye image (eye-image signal; electric signal of the eye image) acquired from the image pickup element 17 for eye to the CPU 3.

At Step S803, the CPU 3 acquires coordinates of points corresponding to cornea-reflected images Pd, Pe of the light sources 13a, 13b and the pupil center c from the eye image acquired at Step S802.

The infrared light emitted from the light sources 13a, 13b illuminates a cornea 142 of the eyeball 14 of the user. At this time, the cornea-reflected images Pd, Pe formed by a part of the infrared light reflected on the surface of the cornea 142 are collected by the light-receiving lens 16, form an image on the image pickup element 17 for eye, and become cornea-reflected images Pd', Pe' in the eye image. Similarly, light fluxes from end portions a, b of the pupil 141 also form images on the image pickup element 17 for eye and become pupil end images a', b' in the eye image.

FIG. 7B illustrates brightness information (brightness distribution) of a region a' in the eye image in FIG. 7A. In FIG. 7B, with a horizontal direction of the eye image as the X-axis direction and a perpendicular direction as the Y-axis direction, the brightness distribution in the X-axis direction is illustrated. In this embodiment, supposing that coordinates of the cornea-reflected images Pd', Pe' in the X-axis direction (horizontal direction) are Xd, Xe, and coordinates of the pupil end images a', b' in the X-axis direction are Xa, Xb. As shown in FIG. 7B, the brightness at an extremely high level is acquired at the coordinates Xd, Xe of the cornea-reflected images Pd', Pe'. In a region from the coordinate Xb to the coordinate Xa, corresponding to the region of the pupil 141 (the region of the pupil image acquired by image formation of the light flux from the pupil 141 on the image pickup element 17 for eye), the brightness at an extremely low level is acquired except the coordinates Xd, Xe. And in a region of an iris 143 on the outer side of the pupil 141 (region of an iris image on the outer side of the pupil image acquired by image formation of the light flux from the iris 143), the brightness in the middle of the above two kinds of brightness is acquired. Specifically, the brightness in the middle of the above two kinds of brightness is acquired in the region with the X-coordinate (coordinate in the X-axis direction) smaller than the coordinate Xb and the region with the X-coordinate larger than the coordinate Xa.

From the brightness distribution as shown in FIG. 7B, the X-coordinates Xd, Xe of the cornea-reflected images Pd', Pe' and the X-coordinates Xa, Xb of the pupil end images a', b' can be acquired. Specifically, the coordinates with the extremely high brightness can be acquired as the coordinates of the cornea-reflected images Pd', Pe', and the coordinates with the extremely low brightness can be acquired as the coordinates of the pupil end images a', b'. Moreover, if a rotation angle θx of the optical axis of the eyeball 14 with respect to the optical axis of the light-receiving lens 16 is small, the coordinate Xc of a pupil center image c' (center of the pupil image) acquired by image formation of the light flux from the pupil center c on the image pickup element 17 for eye can be expressed as Xc≈(Xa+Xb)/2. That is, the coordinate Xc of the pupil center image c' can be calculated from the X-coordinates Xa, Xb of the pupil end images a', b'. As described above, the coordinates of the cornea-reflected images Pd', Pe' and the coordinates of the pupil center image c' can be estimated.

At Step S804, the CPU 3 calculates an image-forming magnification β of the eyeball image. The image-forming magnification β is a magnification determined by the position of the eyeball 14 with respect to the light-receiving lens 16 and can be acquired by using a function of the interval (Xd−Xe) of the cornea-reflected images Pd', Pe'.

At Step S805, the CPU 3 calculates the rotation angle of the optical axis of the eyeball 14 with respect to the optical axis of the light-receiving lens 16. An X-coordinate of a middle point of the cornea-reflected image Pd and the cornea-reflected image Pe substantially matches an X-coordinate of a curvature center O of the cornea 142. Thus, supposing that a standard distance from the curvature center O of the cornea 142 to the center c of the pupil 141 is Oc, the rotation angle θx of the eyeball 14 in the Z-X plane (plane perpendicular to the Y-axis) can be calculated by the following formula 1. A rotation angle θy of the eyeball 14 in the Z-Y plane (plane perpendicular to the X-axis) can be also calculated by a method similar to the calculating method of the rotating angle θx.

$$\beta \times Oc \times \mathrm{SIN}\theta x \approx \{(Xd+Xe)/2\} - Xc \qquad \text{(formula 1)}$$

At Step S806, the CPU 3 acquires (acquires) the sight point of the user (line-of-sight position; position where the user is looking at) in the screen of the display device 10 by using the rotation angles θx, θy calculated at Step S805. Assuming that the coordinates (Hx, Hy) of the sight point are coordinates corresponding to the pupil center c, the coordinates (Hx, Hy) of the sight point can be calculated by the following formulas 2, 3.

$$Hx = m \times (Ax \times \theta x + Bx) \quad \text{(Formula 2)}$$

$$Hy = m \times (Ay \times \theta y + By) \quad \text{(Formula 3)}$$

The parameter m in the formulas 2, 3 is a constant determined by the configuration of the finder optical system (light-receiving lens 16 and the like) of the camera 1 and is a conversion coefficient which converts the rotation angles θx, θy to the coordinates corresponding to the pupil center c in the screen of the display device 10. The parameter m is supposed to be determined in advance and stored in the memory 4. The parameters Ax, Bx, Ay, By are line-of-sight correction parameters which correct an individual difference of the line-of-sight and are acquired by performing a calibration work, which will be described later. The parameters Ax, Bx, Ay, By are supposed to be stored in the memory 4 before the line-of-sight detection operation is started.

At Step S807, the CPU 3 stores the coordinates (Hx, Hy) of the sight point in the memory 4 and finishes the line-of-sight detection operation. FIG. 8 illustrates an example in which the rotation angle of the eyeball is acquired by using the cornea-reflected images of the light sources 13a, 13b and the coordinates of the sight point on the display device 10 are acquired, but this is not limiting. A method of acquiring the rotation angle of the eyeball from the eyeball image may also be a method of measuring a line-of-sight from the pupil center position or the like.

Description of Calibration Work

As described above, by acquiring the rotation angles θx, θy of the eyeball 14 from the eye image in the line-of-sight detection operation and by coordinate-converting the position of the pupil center c to a position on the screen of the display device 10, the sight point can be detected.

Figure 5B:
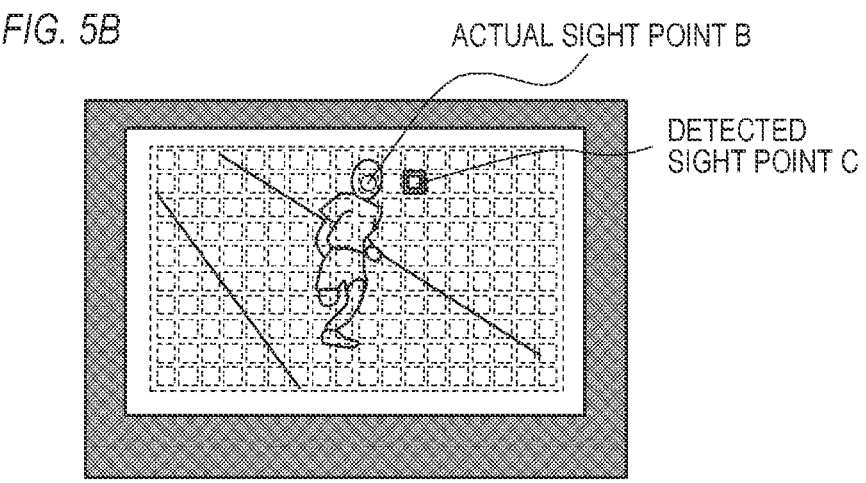

However, the sight point cannot be detected with high accuracy in some cases due to factors such as the individual difference of the eyeball shape of a human and the like. Specifically, if the line-of-sight correction parameters Ax, Ay, Bx, By are not adjusted to values suitable for the user, as shown in FIG. 5B, a shift is generated between an actual sight point B and a detected sight point C. In FIG. 5B, the user stares at a human, but the camera 1 erroneously detects that a background is stared at and thus, such a state is generated that appropriate focus detection and adjustment cannot be made.

Thus, before the camera 1 starts photographing, the calibration work needs to be performed in order to acquire sight-point correction parameters suitable for the user and to store them in the camera 1.

Figure 5C:
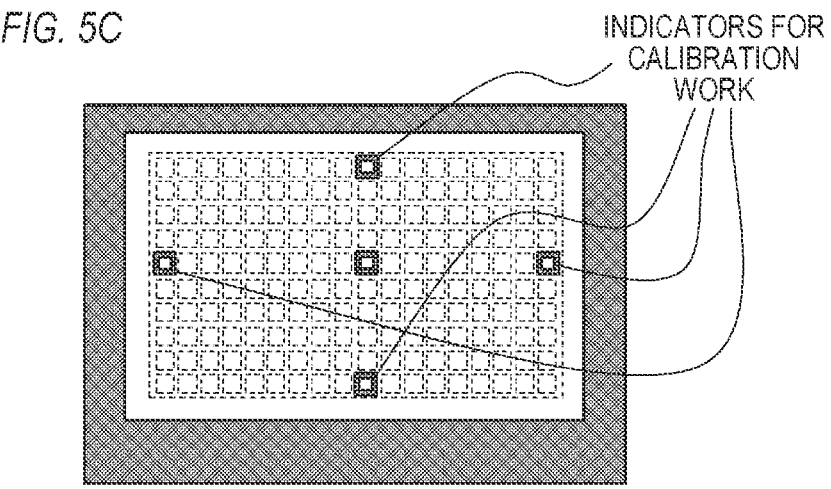

Conventionally, the calibration work has been performed by displaying a plurality of the indicators with different positions as in FIG. 5C in a highlighted manner on the screen of the display device 10 before imaging and by having the user see the indicators. And an art of acquiring the sight-point correction parameters suitable for the user from a plurality of detected (acquired) sight points (line-of-sight positions) and the coordinates of each indicator by performing the line-of-sight detection operation when each of the indicators is stared at has been known as a publicly-known art. As long as the position where the user should see is suggested, a displaying method of the indicator is not particularly limited, and graphics which is the indicator may be displayed or the indicator may be displayed by brightness or a change of a color of the image (picked-up image or the like).

Control of the line-of-sight responsiveness to the line-of-sight of the user will be described by referring to FIGS. 9A to 9C, FIGS. 10A to 10C, and FIG. 11. The line-of-sight responsiveness is responsiveness to a change in the detection position of the line-of-sight with respect to a change in an actual line-of-sight direction of the user. FIGS. 9A to 9C and FIGS. 10A and 10C are diagrams exemplifying the line-of-sight indicator (indicator indicating the detected line-of-sight position) when the subject has moved. The camera 1 executes display control indicating the line-of-sight position in the image by the line-of-sight indicator with respect to movement of the line-of-sight of the user. The line-of-sight responsiveness can also be considered to be responsiveness of movement of the line-of-sight indicator with respect to the movement of the line-of-sight of the user.

Figure 9A:
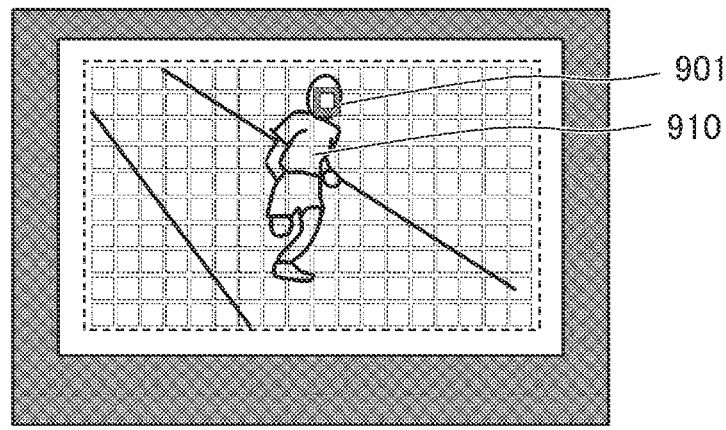
FIGS. 9A to 9C are diagrams for explaining a case where a line-of-sight responsiveness is set lower than a standard.
Figure 9B:
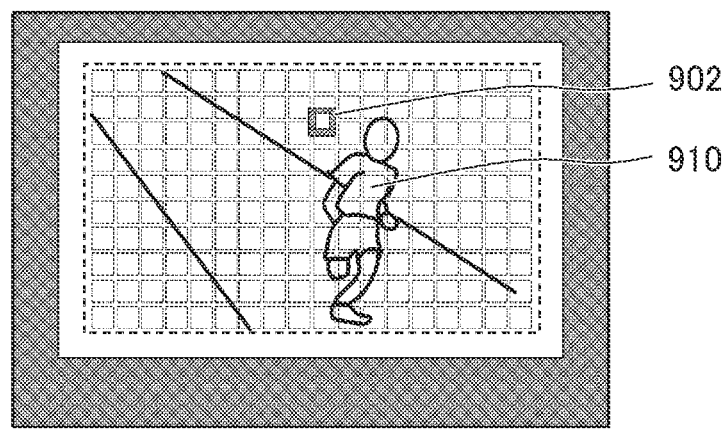
Figure 9C:
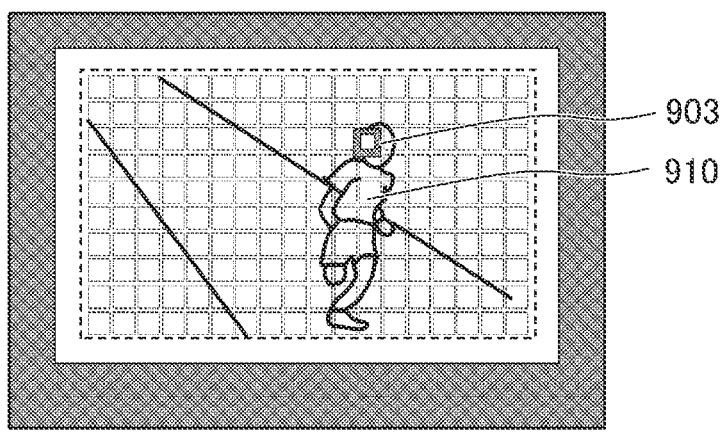

FIGS. 9A to 9C are diagrams for explaining a case where the line-of-sight responsiveness is set lower than the standard. FIG. 9A shows a line-of-sight indicator 901 before a subject 910 starts moving. FIG. 9B shows a line-of-sight indicator 902 when the subject 910 is moving. FIG. 9C shows a line-of-sight indicator 903 after the subject 910 has moved for predetermined time or a predetermined distance.

In FIG. 9A, it is a state before the subject 910 starts moving, and the line-of-sight indicator 901 is in a state overlapping a position of the subject 910. In FIG. 9B, even after the subject 910 started moving, since the line-of-sight responsiveness is set low, the line-of-sight indicator 902 does not follow the position of the subject 910. In FIG. 9C, after the movement of the subject 910 for the predetermined time or the predetermined distance has been completed, the line-of-sight indicator 903 follows the position of the subject 910 with a delay.

When the line-of-sight responsiveness is set lower than the standard, the indicator indicating the line-of-sight position of the user does not follow the position of the subject 910 during the movement of the subject 910 in some cases. If the movement of the indicator indicating the line-of-sight position of the user is delayed from the subject 910, the camera 1 does not focus on the subject 910 intended by the user anymore in some cases.

Figure 10A:
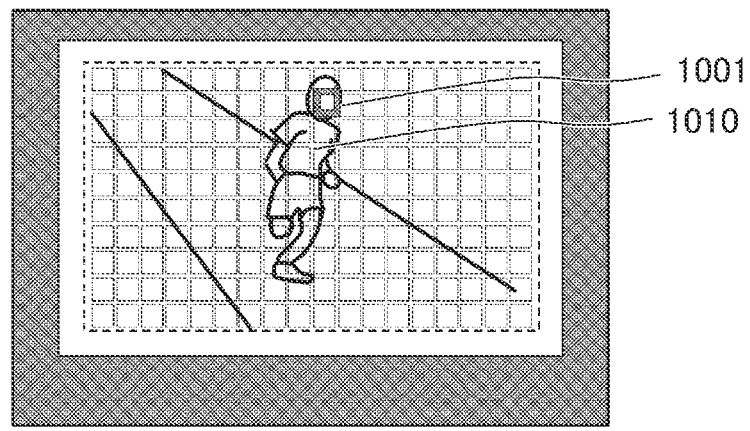
FIGS. 10A to 10C are diagrams for explaining a case where the line-of-sight responsiveness is set higher than a standard.
Figure 10B:
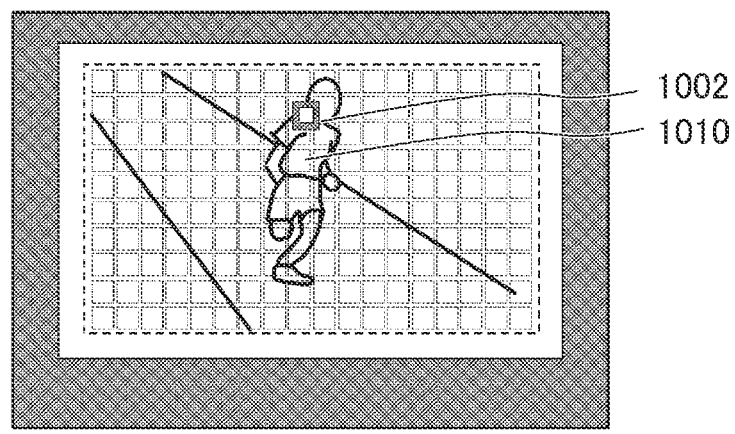
Figure 10C:
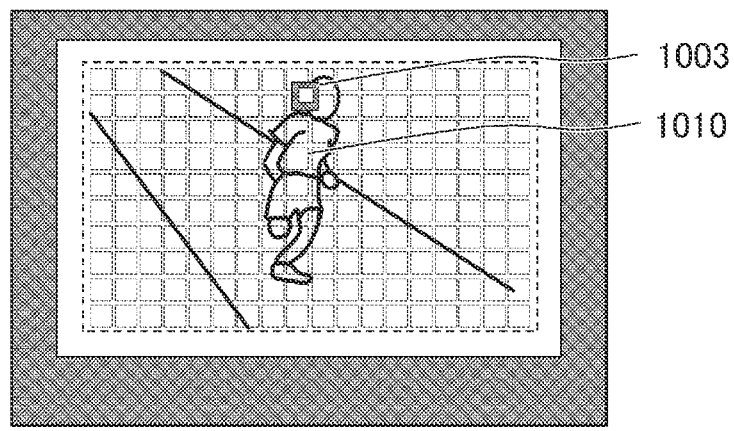

FIGS. 10A to 10C are diagrams for explaining a case where the line-of-sight responsiveness is set higher than the standard. It is supposed that, while time has elapsed from a state in FIG. 10A to a state in FIG. 10C, a subject 1010 does not move.

In FIG. 10A, a line-of-sight indicator 1001 is in a state overlapping a position of the subject 1010. In FIG. 10B, even though the subject 1010 has not moved, a line-of-sight indicator 1002 is displayed at a position shifted from the position of the subject 1010. Since the eye of a human performs slight vibration even when it stares at a point (hereinafter, involuntary eye movement), if the line-of-sight responsiveness is set high, the line-of-sight indicator 1002 is moved by an influence of the involuntary eye movement. Even after that, the influence of the involuntary eye movement remains as shown in FIG. 10C, and a line-of-sight indicator 1003 is displayed at a shifted position.

If the responsiveness of the line-of-sight is set higher than the standard, even if the subject 1010 remains still, an indicator indicating the line-of-sight position of the user might be shifted from the position of the subject 1010 by the influence of the involuntary eye movement. If the indicator indicating the line-of-sight position of the user is shifted from the position of the subject 1010, the camera 1 does not focus on the subject 1010 intended by the user in some cases.

In order to suppress the influence of the involuntary eye movement described in FIGS. 10A to 10C, the line-of-sight responsiveness can be suppressed by applying a filter such as Infinite Impulse Response (IIR) or the like to a position fluctuation amount by time of the sight point (line-of-sight position). The IIR filter is acquired by multiplying a discreet-time signal y[n] of an output by a coefficient set in advance for each of N times of output y[n−1] in the past. . . . , y[n−N] and N times of input x[n] . . . , x[n−N] at present and past. Since the IIR filter is a publicly-known art, detailed description is omitted. The coefficient of the IIR filter corresponds to a parameter of the filter in this embodiment, and characteristics of the filter are determined by the parameter. By changing the parameter of the filter, the CPU 3 can suppress the influence of the involuntary eye movement or can change the line-of-sight responsiveness.

Not limited to the aforementioned filter, any filter in a temporal direction which suppresses temporal fluctuation at the present time can be applied to the present disclosure. For example, the CPU 3 may suppress the line-of-sight responsiveness by using a filter which applies moving average. Specifically, it is assumed that the positions of the sight points in each of up to immediately preceding five frames are X(t−5), X(t−4), X(t−3), X(t−2), X(t−1) and the position of the sight point at the present frame is X(t). A focused position is acquired as the moving average in the temporal direction such as X'(t)={X(t−5)+X(t−4)+X(t−3)+X(t−2)+X(t−1)+X(t)}/5. Even if a sudden fluctuation of the sight point occurs at the X-coordinate X(t) of the present frame, by taking the moving average in the temporal direction of the sight-point positions X(t−5) to X(t−1) in the immediately preceding five frames, the influence of the fluctuation of the sight point is reduced at the focused position X'(t).

As described above, the CPU 3 can suppress the influence of reflective movement of the line-of-sight not intended by the user on the detected line-of-sight position (sight point) by applying the filter in the temporal direction to the position fluctuation amount of the sight point.

By referring to FIG. 11, a changing operation of the line-of-sight responsiveness will be described. Processing at each Step of the flowchart shown in FIG. 11 is executed by the CPU 3 in the camera casing 1B.

At Step S1101, the CPU 3 determines whether the display device 10 of the camera casing 1B is looked into by the user or not. Whether the user is looking into the display device 10 or not can be determined, for example, by sensing contact of the eye with the finder and separation from the eye by a sensor, not shown. When it is determined that the user has looked into the display device 10, the processing proceeds to Step S1102. If it is determined that the user does not look into the display device 10, the processing at Step S1101 is repeated until the line-of-sight of the user is detected.

At Step S1102, the CPU 3 acquires the line-of-sight position by the aforementioned line-of-sight detection algorithm. The line-of-sight position here is a position detected as a position where the user is looking at in the display device 10. The display device 10 displays an image picked up by the image pickup element 2, and the CPU 3 can determine which subject the user is looking at. The line-of-sight position here is a line-of-sight position to which the filter in the temporal direction such as the IIR filter was applied. The CPU 3 can display the acquired line-of-sight position as the line-of-sight indicator 901 or the line-of-sight indicator 902 shown in FIG. 9A to 9C, for example.

The CPU 3 may omit the processing at Step S1101 and determine whether the line-of-sight position has been acquired or not subsequently to Step S1102. If it is determined that the line-of-sight position has been acquired, the processing proceeds to Step S1103, while if not, the processing proceeds to Step S1102.

At Step S1103, the CPU 3 detects the subject (object) the user is looking at and acquires the position of the detected subject on the basis of the image picked up by the image pickup element 2 and the line-of-sight position acquired at Step S1102.

At Step S1104, the CPU 3 sets the line-of-sight responsiveness by changing the parameter of the IIR filter. The CPU 3 changes the parameter of the IIR filter on the basis of a shift amount ΔX between a moving amount of the line-of-sight position and a moving amount of the subject (object) moving in predetermined time, for example.

The larger the shift amount ΔX becomes, the more the line-of-sight position does not match the position of the subject. Thus, the parameter of the filter is set so that, if the shift amount ΔX and the moving amount of the subject increase, the line-of-sight responsiveness becomes higher. Moreover, the parameter of the filter is set so that, if the shift amount ΔX increases and the moving amount of the subject decreases, the line-of-sight responsiveness is lowered. Furthermore, if the shift amount ΔX decreases, the parameter of the filter is not changed anymore. Information of the parameter is uniquely changed with respect to the shift amount ΔX.

As described above, according to the aforementioned embodiment, the camera 1 can improve the line-of-sight responsiveness so as to cause the line-of-sight position to follow movement of the subject while suppressing the shift of the line-of-sight position caused by the involuntary eye movement by adjusting the line-of-sight responsiveness by changing the parameter of the filter.

Variation 1

In the aforementioned embodiment, FIG. 11 illustrates a method of changing the line-of-sight responsiveness by changing the characteristic of the filter (parameter) on the basis of the shift amount ΔX. In the variation 1, the camera 1 suppresses the characteristic of the filter by comparing the shift amount ΔX with a threshold value.

Figure 12:
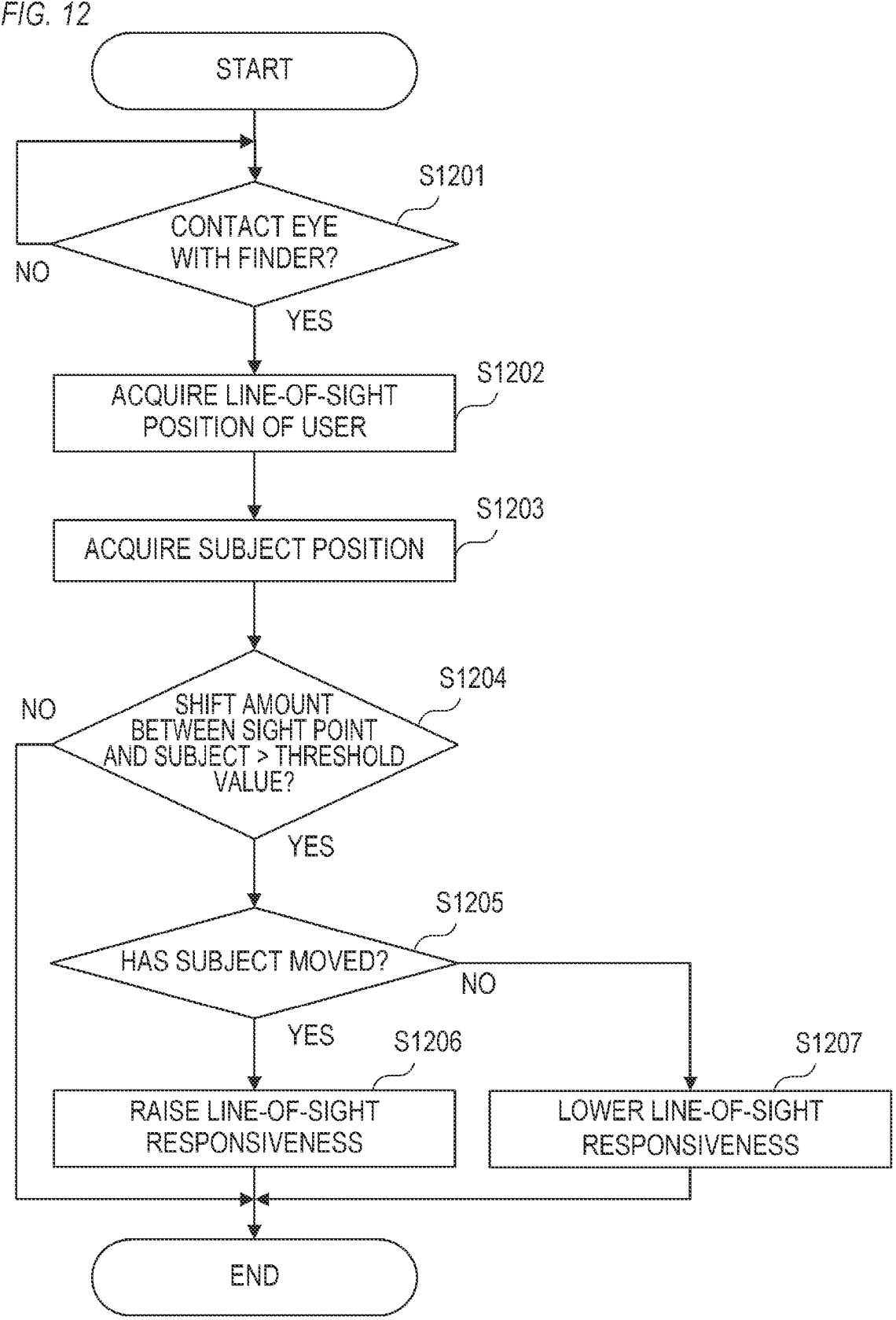
FIG. 12 is a flowchart of the changing operation of the line-of-sight responsiveness using a threshold value.

By referring to FIG. 12, a changing operation of the line-of-sight responsiveness using the threshold value will be described. Processing at each Step in the flowchart shown in FIG. 12 is executed by the CPU 3 of the camera casing 1B. Since the processing from Step S1201 to Step S1203 is the same as the processing from Step S1101 to Step S1103 in FIG. 11, the description will be omitted.

At Step S1204, the CPU 3 determines whether the shift amount ΔX between the moving amount of the line-of-sight position and the moving amount of the subject (object) moving in predetermined time is larger than a predetermined threshold value Xth or not. The predetermined threshold value Xth is set in accordance with the line-of-sight responsiveness, which is responsiveness by which the movement of the line-of-sight of the user is reflected in the line-of-sight position. The higher the line-of-sight responsiveness is, the larger value is set as the predetermined threshold value Xth.

If the shift amount ΔX between the moving amount of the line-of-sight position and the moving amount of the subject does not exceed the predetermined threshold value Xth, the line-of-sight responsiveness is assumed to be appropriate, and the processing in FIG. 12 is finished. If the shift amount ΔX between the moving amount of the line-of-sight position and the moving amount of the subject exceeds the predetermined threshold value Xth, the processing proceeds to Step S1205.

At Step S1205, the CPU 3 determines whether the subject has moved or not. If the shift amount ΔX exceeds the predetermined threshold value Xth, and the subject has moved, the movement of the line-of-sight of the user is line-of-sight movement for following the position of the subject, and it can be determined that the reaction speed of the line-of-sight is lowered. If the shift amount ΔX exceeds the predetermined threshold value Xth, and the subject has not moved, it can be determined that the movement of the line-of-sight of the user is involuntary eye movement. That is, at Step S1206 and Step S1207, the line-of-sight responsiveness is adjusted on the basis of whether the movement of the line-of-sight of the user is involuntary eye movement or line-of-sight movement.

The CPU 3 can determine, for example, that movement has been made if the moving amount of the subject in predetermined time is larger than a predetermined amount. If the subject has moved, or if a state in FIG. 9A changes to a state in FIG. 9B, for example, the processing proceeds to Step S1206. If the subject has not moved, or if a state in FIG. 10A changes to a state in FIG. 10B, for example, the processing proceeds to Step S1207.

At Step S1206, the CPU 3 raises the line-of-sight responsiveness. At Step S1206, since the shift amount ΔX is larger than the predetermined threshold value Xth, and the subject has moved, the CPU 3 can suppress the shift amount ΔX by setting the line-of-sight responsiveness higher than the present so as to cause the line-of-sight position to follow the movement of the subject.

At Step S1207, the CPU 3 lowers the line-of-sight responsiveness. At Step S1207, since the shift amount ΔX is larger than the predetermined threshold value Xth, and the subject is not moving, the CPU 3 can suppress the shift between the line-of-sight position and the subject position caused by the involuntary eye movement by setting the line-of-sight responsiveness lower than the present.

As described above, according to the variation 1, the camera 1 changes the line-of-sight responsiveness through control of the characteristics of the filter by comparing the shift amount ΔX and the threshold value. Moreover, the camera 1 changes the shift-line responsiveness by determining whether the subject is moving or not. When the subject is moving, the slower the reaction speed of the line-of-sight is, the larger the shift amount ΔX becomes. When the subject is not moving, the shift amount ΔX becomes larger by the influence of the involuntary eye movement or reflective movement of the line-of-sight in some cases. Therefore, the camera 1 can adjust the line-of-sight responsiveness by considering the reaction speed of the line-of-sight of the user with respect to the subject.

Variation 2

The line-of-sight responsiveness may be configured to be adjusted by setting appropriate parameters according to a type of the subject to be photographed or a type of a photographed scene. In the variation 2, the camera 1 has a function of determining the type of the subject and the type of the photographed scene and adjusts the line-of-sight responsiveness by applying an appropriate filter characteristic (parameter) on the basis of the information on the determined type. As a result, the camera 1 can appropriately cause the line-of-sight position to follow the subject intended by the user in accordance with the type of the subject or the photographed scene.

Note that the adjustment of the line-of-sight responsiveness based on the type of the subject and the type of the photographed scene may be performed when the photographing is started or when the subject or the photographed scene is changed or may be performed at predetermined intervals (5-minute interval, for example). Moreover, the type of the subject and the type of the photographed scene may be determined by analyzing the brightness information and the like of the image or may be determined on the basis of the setting information of the camera 1.

Figure 13:
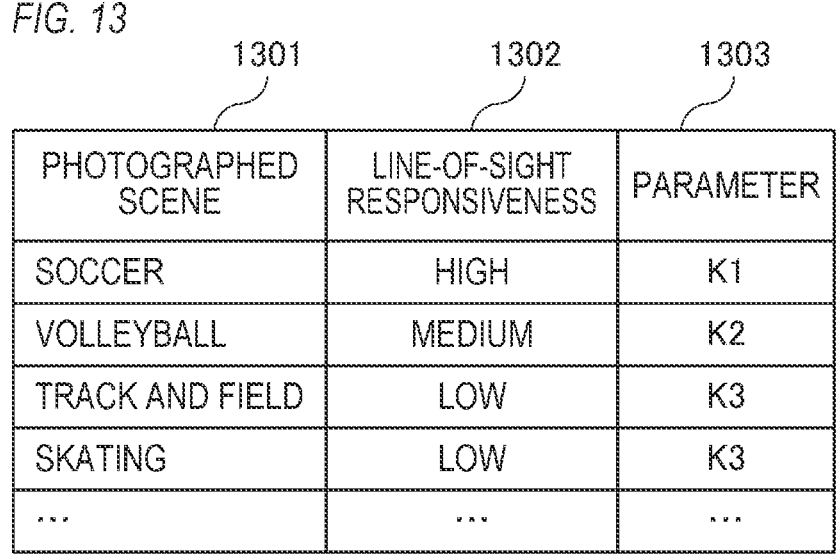
FIG. 13 is a diagram exemplifying setting information of the line-of-sight responsiveness of each photographing scene.

By referring to FIG. 13, a setting example of the line-of-sight responsiveness according to the type of the photographed scene will be described. FIG. 13 is a diagram exemplifying the setting information of the line-of-sight responsiveness for each photographed scene. Regarding FIG. 13, the setting of the line-of-sight responsiveness for each photographed scene related to sports will be described.

The line-of-sight responsiveness and the parameters are determined in advance for each photographed scene and is stored in a memory region (the memory 4 in FIG. 2 and the memory 429 in FIG. 3) provided in the camera 1. The line-of-sight responsiveness for each photographed scene and the parameter information stored in the memory 4 are read out when the subject or the photographed scene is identified and used for the adjustment of the line-of-sight responsiveness.

The setting information of the line-of-sight responsiveness includes information on a photographed scene 1301, line-of-sight responsiveness 1302, and a parameter 1303 and is stored in the memory 4 with mutual association with each information. The photographed scene 1301 is information indicating a scene detected by the CPU 3. The line-of-sight responsiveness 1302 is information indicating setting of the line-of-sight responsiveness in the photographed scene 1301. The parameter 1303 is a specific filter characteristic or a set value of the parameter in the photographed scene 1301.

When the line-of-sight responsiveness is set by using the IIR filter, the information on the parameter 1303 corresponds to the set value which determines a cut-off frequency of the IIR filter. Moreover, the information on the parameter 1303 can be the number of pieces of use data such as data up to how many immediate preceding frames is used, when a filter in the temporal direction is used.

In the example in FIG. 13, the line-of-sight responsiveness 1302 is defined in three stages, that is, "high", "medium", and "low". Regarding the parameter 1303, "K1", "K2", and "K3" are shown as identifiers for specifying values of the parameters corresponding to the respective line-of-sight responsiveness 1302. If the photographed scene 1301 is "soccer", a direction and a moving amount that a player moves are random and thus, the shift amount ΔX tends to be larger, and the line-of-sight responsiveness is set to "high". On the other hand, if the photographed scene 1301 is "track and field", "skating", since the direction and the moving amount that the player moves can be predicted, the shift amount ΔX is considered to be smaller than that of "soccer" and thus, the line-of-sight responsiveness is set to "low". As described above, by changing the line-of-sight responsiveness in accordance with the type of the photographed scene, the CPU 3 can cause the line-of-sight position to appropriately follow the position of the subject.

Note that the detection interval of the line-of-sight may be changed in accordance with the line-of-sight responsiveness. For example, when the line-of-sight responsiveness is raised, the interval of the line-of-sight detection is narrowed, while when the line-of-sight responsiveness is lowered, the interval of the line-of-sight detection is prolonged so that power consumption when the line-of-sight responsiveness is lowered can be suppressed.

Moreover, the example in which the line-of-sight responsiveness is set in accordance with the photographed scene was described in the variation 2, but this is not limiting, and the CPU 3 may change the line-of-sight responsiveness in accordance with the type of a photographing target such as the subject. For example, in the case of the photographing target such as a child and a dog whose moving directions are rapidly changing at random, the shift amount ΔX tends to become larger, and the line-of-sight responsiveness is required to be set higher in order to cause the line-of-sight position to follow the movement of the photographing target.

On the other hand, in the case of the photographing target such as an adult and a horse whose moving directions are constant and are not changed largely, since the user can predict the movement of the photographing target, the shift amount ΔX tends to be smaller. In this case, the CPU 3 is required to cause the line-of-sight position to stably follow the movement of the photographing target by ignoring the shift amount by the reflected movement of the line-of-sight by lowering the line-of-sight responsiveness.

As described above, in the variation 2, the camera 1 adjusts the line-of-sight responsiveness in accordance with the type of photographing target. Since the line-of-sight responsiveness is changed in accordance with the characteristic of the movement of the photographing target, the camera 1 can realize stable focusing on the subject by causing the line-of-sight position to follow the movement of the photographing target.

Variation 3

The line-of-sight responsiveness may be configured to be adjusted by setting an appropriate parameter for each user. In the variation 3, the CPU 3 adjusts the line-of-sight responsiveness in accordance with the information specific to a user (hereinafter, also referred to as user information) such as an age, a reaction speed of the line-of-sight to the subject and the like.

The reaction speed of the line-of-sight to the subject tends to lower with aging. Thus, the CPU 3 may adjust the line-of-sight responsiveness in accordance with the information such as the age of the user recorded in the memory 4 in advance, for example.

Moreover, the CPU 3 may adjust the line-of-sight responsiveness in accordance with the reaction speed of the line-of-sight of the user to the subject. The reaction speed of the line-of-sight to the subject can be evaluated in advance in a calibration work, for example. The CPU 3 only needs to evaluate the reaction speed of the line-of-sight of the user when the indicator is moved in the calibration work.

Note that the adjustment of the line-of-sight responsiveness based on the user information may be performed when the photographing is started, for example. Moreover, the adjustment of the line-of-sight responsiveness based on the user information may be performed at a predetermined interval (30 minutes, for example) by considering a change in the body condition of the user or a change of the photographer.

Moreover, the CPU 3 may adjust the line-of-sight responsiveness by combining the variation 3 with the variation 2. For example, when the line-of-sight responsiveness is to be set in accordance with the type of the subject or the type of the photographed scene, the CPU 3 can set the parameter of the filter by multiplying a weighting coefficient according to the user information. Specifically, the CPU 3 performs weighting so that the line-of-sight responsiveness becomes higher if the reaction speed of the line-of-sight to the subject is slower than a standard speed.

As described above, in the variation 3, the line-of-sight responsiveness is adjusted in accordance with the information such as the reaction speed of the line-of-sight different for each user and the like and thus, the camera 1 can appropriately adjust the line-of-sight responsiveness in accordance with the respective users.

Note that, in the aforementioned embodiment, the shift amount ΔX is described as a shift amount in a moving amount between the moving amount of the line-of-sight position and the moving amount of the position of the object moving in predetermined time, but this is not limiting. The shift amount ΔX may be a shift amount in moving time between the moving time of the line-of-sight position and the moving time of the position of the object moving for a predetermined distance.

As described above, according to the embodiment and each of the variations, in the camera 1 having the line-of-sight detection function, the responsiveness of the line-of-sight detection can be adjusted by considering the reaction speed of the line-of-sight of the user to the subject.

As described above, the preferred embodiments of the present disclosure were described but the present disclosure is not limited to these embodiments but is capable of various modifications and changes within the range of the gist thereof.

Application Example to Other Electronic Apparatus

Figure 14A:
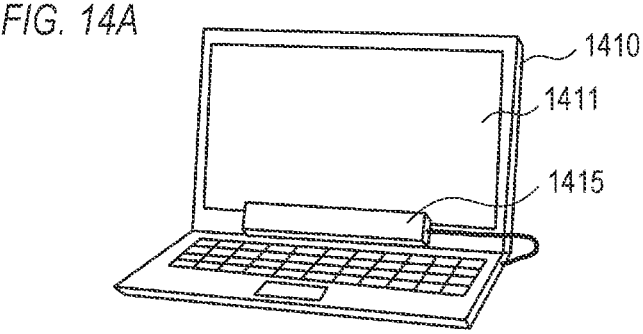
FIGS. 14A to 14C are appearance diagrams illustrating an example of another electronic apparatus to which the present disclosure can be applied.

FIG. 14A is an appearance diagram of a notebook-type personal computer 1410 (laptop PC). In FIG. 14A, an image pickup unit 1415 which picks up an image of the user who looks at a display 1411 of the laptop PC 1410 is connected to the laptop PC 1410, and the laptop PC 1410 acquires an image pickup result from the image pickup unit 1415. Then, the laptop PC 1410 detects the line-of-sight of the user on the basis of the image pickup result. The image pickup unit 1415 may perform the line-of-sight detection. The present disclosure can be applied also to the laptop PC 1410 and the image pickup unit 1415.

Figure 14B:
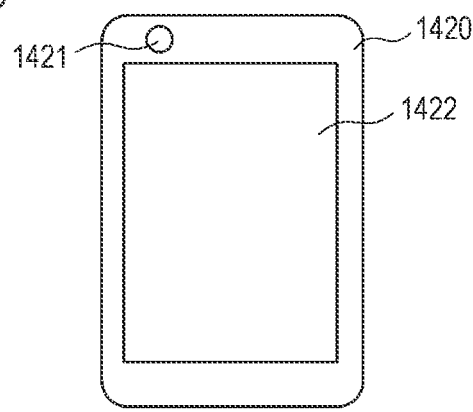

FIG. 14B is an appearance diagram of a smartphone 1420. In FIG. 14B, the smartphone 1420 detects the line-of-sight of the user who looks at a display 1422 of the smartphone 1420 on the basis of the image pickup result of an in-camera 1421 (front camera). The present disclosure can be applied also to the smartphone 1420. Similarly, the present disclosure can be applied also to various tablet terminals.

Figure 14C:
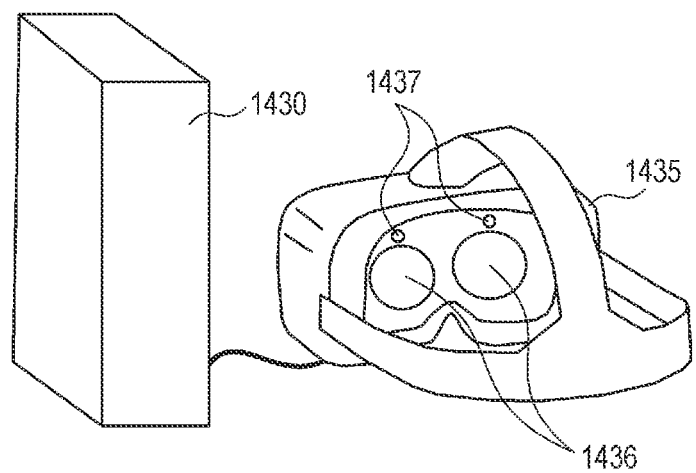

FIG. 14C is an appearance diagram of a game machine 1430. In FIG. 14C, a head-mount display 1435 (HMD) which displays a VR (Virtual Reality) image of a game on a display 1436 is connected to the game machine 1430. The HMD 1435 has a camera 1437 which picks up an image of an eye of the user who wears the HMD 1435, and the game machine 1430 acquires the image pickup result from the HMD 1435. And the game machine 1430 detects the line-of-sight of the user on the basis of the image pickup result. The HMD 1435 may perform the line-of-sight detection. The present disclosure can be applied also to the game machine 1430 and the HMD 1435. Similarly to that the present disclosure can be applied to the case where the VR image displayed on the HMD is looked at, the present disclosure can be applied also to a case where an AR (Augmented Reality) image displayed on a lens portion of a glasses-type wearable terminal is looked at. Similarly to that the present disclosure can be applied also to the VR art and the AR art, the present disclosure can be applied also to other xR arts such as MR (Mixed Reality) art and the SR (Substitutional Reality) art.

According to the present disclosure, the responsiveness of the line-of-sight position detected with respect to the line-of-sight of the user can be adjusted by considering the reaction speed of the line-of-sight of the user.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-173260, filed on Oct. 22, 2021, which is hereby incorporated by reference herein in its entirety.

What is claimed is:

1. An electronic apparatus comprising at least one memory and at least one processor which function as:
 a first acquiring unit configured to detect a line-of-sight of a user and to acquire a line-of-sight position of the user in an image displayed on a display;
 a second acquiring unit configured to acquire a position of an object in the image;
 a display control unit configured to control to display an indicator indicating the line-of-sight position acquired by the first acquiring unit on the display;
 an adjustment unit configured to adjust a responsiveness of a movement of the indicator with respect to a movement of the line-of-sight of the user; and
 a control unit configured to control the adjustment unit on the basis of a shift amount in a moving amount for predetermined time between a moving amount of the line-of-sight position and a moving amount of the position of the object, or a shift amount in moving time for a predetermined distance between moving time of the line-of-sight position and moving time of the position of the object,
 wherein the control unit is configured to control to adjust the responsiveness by the adjustment unit in a case where the shift amount of the moving amount or the shift amount of the moving time is larger than a predetermined threshold value, and control not to adjust the responsiveness by the adjustment unit in a case where the shift amount of the moving amount or the shift amount of the moving time is not larger than the predetermined threshold value.

2. The electronic apparatus according to claim 1, wherein the at least one memory and the at least one processor further function as:
 a display control unit configured to display an indicator indicating the line-of-sight position in the image on the display,
 wherein the line-of-sight responsiveness is responsiveness of movement of the indicator with respect to movement of a line-of-sight of the user.

3. The electronic apparatus according to claim 1, wherein the adjustment unit is configured to determine whether the movement of the line-of-sight of the user is involuntary eye movement or line-of-sight movement for following the position of the object and to adjust the line-of-sight responsiveness on the basis of whether the movement is the involuntary eye movement or the line-of-sight movement.

4. The electronic apparatus according to claim 1, wherein the adjustment unit is configured to adjust the line-of-sight responsiveness on the basis of a type of a scene of the image or a type of the object.

5. The electronic apparatus according to claim 4, wherein the adjustment unit is configured to adjust the line-of-sight responsiveness when the type of the scene of the image or the type of the object is changed.

6. The electronic apparatus according to claim 1, wherein the adjustment unit is configured to adjust the line-of-sight responsiveness in accordance with a reaction speed of the line-of-sight of the user with respect to the position of the object.

7. The electronic apparatus according to claim 1, wherein the adjustment unit is configured to further adjust the line-of-sight responsiveness by weighting according to the reaction speed of the line-of-sight of the user when the line-of-sight responsiveness is to be adjusted on the basis of a type of a scene of the image or a type of the object.

8. The electronic apparatus according to claim 1, wherein the first acquiring unit is configured to shorten a detection interval of the line-of-sight of the user in a case where the line-of-sight responsiveness is raised and to prolong the detection interval of the line-of-sight of the user in a case where the line-of-sight responsiveness is lowered.

9. The electronic apparatus according to claim 1, wherein the at least one memory and the at least one processor further function as:
 a correction unit configured to acquire a correction parameter which corrects a shift between a position at which the user stares and the line-of-sight position acquired by the first acquiring unit, wherein
 the adjustment unit is configured to set the line-of-sight responsiveness by using the line-of-sight position corrected by the correction parameter.

10. The electronic apparatus according to claim 1, wherein the adjustment unit is configured to adjust the line-of-sight responsiveness by using an IIR (Infinite Impulse Response) filter or a filter which applies moving average in a temporal direction.

11. The electronic apparatus according to claim 1, wherein the control unit is configured to control the adjustment unit depending on whether the object is moving or not in a case where the shift amount of the moving amount or the shift amount of the moving time is larger than the predetermined threshold value.

12. The electronic apparatus according to claim 11, wherein, in a case where the shift amount of the moving amount or the shift amount of the moving time is larger than the predetermined threshold value, the control unit is configured to control (1) to adjust the responsiveness to increase by the adjustment unit when the object is moving and (2) to adjust the responsiveness to decrease by the adjustment unit when the object is not moving.

13. A control method for an electronic apparatus comprising:
- a first acquiring step of detecting a line-of-sight of a user and acquiring a line-of-sight position of the user in an image displayed on a display;
- a second acquiring step of acquiring a position of an object in the image;
- a display controlling step of controlling to display an indicator indicating the line-of-sight position acquired by the first acquiring step on the display;
- an adjustment step of adjusting a responsiveness of a movement of the indicator with respect to a movement of the line-of-sight of the user; and
- a controlling step of controlling the adjustment step on the basis of a shift amount in a moving amount for predetermined time between a moving amount of the line-of-sight position and a moving amount of the position of the object, or a shift amount in moving time for a predetermined distance between moving time of the line-of-sight position and moving time of the position of the object, wherein in the controlling step, the responsiveness is adjusted in a case where the shift amount of the moving amount or the shift amount of the moving time is larger than a predetermined threshold value, and control not to adjust the responsiveness by the adjustment unit in a case where the shift amount of the moving amount or the shift amount of the moving time is not larger than the predetermined threshold value.

14. A non-transitory computer-readable medium that stores a program for causing a computer to execute a control method for an electronic apparatus, the control method comprising:
- a first acquiring step of detecting a line-of-sight of a user and acquiring a line-of-sight position of the user in an image displayed on a display;
- a second acquiring step of acquiring a position of an object in the image;
- a display controlling step of controlling to display an indicator indicating the line-of-sight position acquired by the first acquiring step on the display;
- an adjustment step of adjusting a responsiveness of a movement of the indicator with respect to a movement of the line-of-sight of the user; and
- a controlling step of controlling the adjustment step on the basis of a shift amount in a moving amount for predetermined time between a moving amount of the line-of-sight position and a moving amount of the position of the object, or a shift amount in moving time for a predetermined distance between moving time of the line-of-sight position and moving time of the position of the object, wherein in the controlling step, the responsiveness is adjusted in a case where the shift amount of the moving amount or the shift amount of the moving time is larger than a predetermined threshold value, and control not to adjust the responsiveness by the adjustment unit in a case where the shift amount of the moving amount or the shift amount of the moving time is not larger than the predetermined threshold value.

* * * * *